(No Model.)
C. L. SPENCER.
STOVE POLISH RECEIVER.
No. 342,233. Patented May 18, 1886.
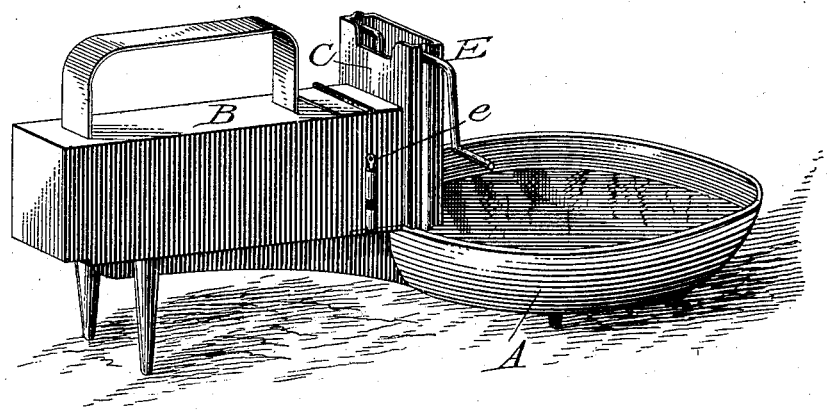
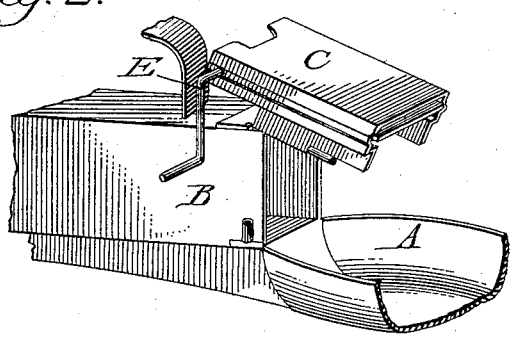
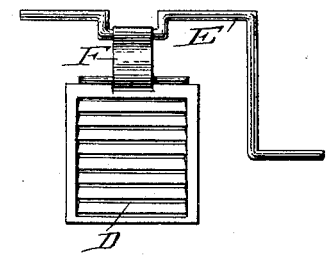
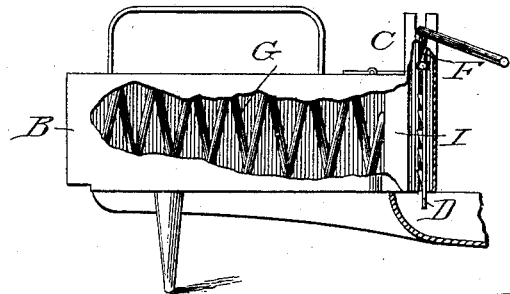
Witnesses.
Fred T. Spencer.
Wm Lee Reynolds.
Inventor:
Charles L. Spencer.

UNITED STATES PATENT OFFICE.

CHARLES L. SPENCER, OF PROVIDENCE, RHODE ISLAND.

STOVE-POLISH RECEIVER.

SPECIFICATION forming part of Letters Patent No. 342,233, dated May 18, 1886.

Application filed July 29, 1885. Serial No. 172,973. (No model.)

*To all whom it may concern:*

Be it known that I, CHARLES L. SPENCER, of the city of Providence, in the county of Providence and State of Rhode Island, have invented a new and useful Improvement in Stove-Polish Receivers; and I do hereby declare that the following is a full, clear, and exact description of the construction and operation of the same, reference being had to the annexed drawings, making a part of this specification, and to the letters of reference marked thereon, in which—

Figure 1 represents an isometrical perspective view showing the parts in position as in use. Fig. 2 is a sectional perspective view of the same, showing the end as open for introducing a cake of stove-polish. Figs. 3 and 4 are parts in detail.

My invention relates to improvements in stove-polish receivers, in which the polish or carburet of iron is mixed preparatory to its use; and it consists in a novel device for easily reducing to powder cakes of stove-polish or carburets as are now prepared and on sale, and in the arrangement of its parts for depositing the same into the mixing-receiver as fast as pulverized, at the same time effectually retaining the cake in position to be operated upon automatically or otherwise without the liability of waste or soiling the hands, as in the ordinary method, substantially as hereinafter described.

In the accompanying drawings, A, Fig. 1, represents the mixing-receiver, into which the polish is deposited after being reduced to powder, B the chamber for holding the cake of stove-polish to be pulverized, and C the retainer for keeping the said cake of stove-polish in place, and in which the pulverizer D is made to operate when set in position for use. (Shown in section, Fig. 4.)

The chamber B is constructed similar in shape as cakes of stove-polish now in market, the square form being the most common, and it is provided at the top with a handle, as a convenient device for holding the machine when in use. One end of said chamber being closed, the opposite end is left open for the purpose of introducing therein cakes of stove-polish, as may be required, and to which end the retainer C is fitted and hinged at the top to be operated similar to a cover. (Shown in section, Fig. 2.)

The sides of the retainer C are formed with a depressed groove or channel, a suitable distance toward the center, running lengthwise, and used as guides for the pulverizer D in its reciprocating motion as made to act against the end of the cake of stove-polish. Said pulverizer D is formed of one piece of metal, cut into divisions through its center, and pressed into shape as a series of knives or edges. (Shown in Fig. 3.) It is not necessary, however, to multiply the knives, as from one cutting-edge, or from rough-made holes, as ordinary graters, similar results may be attained; but from the simplicity and cheapness of the one I have adopted and illustrated in the drawings, Fig. 3, the polish as fast as pulverized passes through the spaces, and is deposited into the mixing-receiver A, and having a number of knives or edges less motion and power is required to the pulverizer in facilitating the action against the entire surface of the end of the cake of stove-polish, with an increased quantity of polish reduced to powder in a short space of time.

At the upper end of the retainer C, across through its sides, a double crank-shaft, E, is arranged, and a link, F, one end of which link is connected to the central crank of said shaft. The opposite end is connected to the top of the pulverizer D, so that by turning with the hand the outer crank of the aforesaid shaft E a given motion is transmitted to the said pulverizer D, thereby gradually reducing to powder the cake of stove-polish within the chamber B from the end with which it is brought in contact.

In attaining an automatic movement of a cake of stove-polish within chamber B a spiral spring, G, is employed, provided with a slide, I, said spring being strained in the rear of the said cake, by which means the opposite end of the aforesaid cake of polish is made to bear against the pulverizer D with a continuous feed-pressure throughout the entire reduction of the same.

In section, Fig. 4 of the drawings, a portion of one side of chamber B is represented as broken away, in showing the spiral spring G as relaxed and the slide I as attached thereto.

From the foregoing the nature and advantages of my invention may be evident to all familiar with such matters, that when the retainer C is thrown open, as shown in section, Fig. 2, a cake of stove-polish may be easily introduced into the chamber B, pressing rearward the slide I, and compressing at the same time the spiral spring G. In this position the said cake of polish may be effectually held therein by closing and fastening the retainer C, after its insertion, by a pin, e, as shown in Fig. 1, thereby attaining the feed-pressure required and lessening the liability of wasting the polish or of soiling the hands in its reduction, as in the ordinary method.

The cake of stove-polish may be pressed or a feed attained by a knob attached to the slide I, guided in a slot on the side of the chamber B, and motion given to the pulverizer D in a similar manner; but from the arrangement of the double-crank shaft E and the spiral spring G, as heretofore described and shown in section, Fig. 4, and which I now prefer, a more explicit description of the last-mentioned method I do not deem necessary.

I am aware that cutting-edges and vessels have heretofore been used for the reducing to powder and in the mixing of stove-polish.

Having thus described my invention and its use, what I claim as new is—

The combination of the chamber B, pressure-spring G, hinged retainer C, pulverizer D, double-crank shaft E, and connecting-link F, with the mixing pan or receiver A, the whole as applied and arranged to operate together, substantially as described, and for the purpose specified.

CHARES L. SPENCER.

Witnesses:
WALTER B. VINCENT,
GEORGE R. BURDON.